(12) United States Patent
Morand et al.

(10) Patent No.: US 7,250,570 B1
(45) Date of Patent: Jul. 31, 2007

(54) HEATING CABLE GUIDE STRIP FOR ELECTRIC RADIANT FLOOR HEATING AND METHOD OF USE

(75) Inventors: Michel Morand, Ile des Soeurs (CA); Philippe Charron, Boucherville (CA)

(73) Assignee: Flextherm Inc., Longueuil, Quebec (CA)

( * ) Notice: Subject to any disclaimer, the term of this patent is extended or adjusted under 35 U.S.C. 154(b) by 0 days.

(21) Appl. No.: 11/348,254

(22) Filed: Feb. 7, 2006

(30) Foreign Application Priority Data

Jan. 17, 2006 (CA) .................................. 2533062

(51) Int. Cl.
*H02G 9/00* (2006.01)

(52) U.S. Cl. ..................... 174/37; 174/72 A; 174/135; 174/68.1; 385/134; 385/135; 242/360

(58) Field of Classification Search ................ 174/662, 174/659, 668, 68.1, 72 A, 135, 72 R, 74 R, 174/154, 138 G, 37; 385/100, 134, 135, 385/136; 242/360, 361.2; 52/220.1, 220.3; 211/26; 219/213
See application file for complete search history.

(56) References Cited

U.S. PATENT DOCUMENTS

| | | | | |
|---|---|---|---|---|
| 3,790,746 A | * | 2/1974 | Krieger ..................... 219/213 |
| 4,646,814 A | * | 3/1987 | Fennesz ...................... 165/56 |
| 4,878,332 A | | 11/1989 | Drake | |
| 5,042,569 A | * | 8/1991 | Siegmund .................. 52/220.3 |
| 5,339,379 A | * | 8/1994 | Kutsch et al. .............. 385/135 |
| 5,894,540 A | * | 4/1999 | Drewing ..................... 385/135 |
| 5,913,006 A | * | 6/1999 | Summach .................... 385/134 |
| 6,361,360 B1 | * | 3/2002 | Hwang et al. .............. 385/135 |
| 6,389,211 B1 | * | 5/2002 | Mandry et al. ............. 385/135 |
| 6,396,989 B1 | * | 5/2002 | Johnston et al. ........... 385/134 |
| 6,540,312 B1 | * | 4/2003 | Lane .......................... 211/26 |
| 6,944,383 B1 | * | 9/2005 | Herzog et al. ................ 174/50 |

* cited by examiner

*Primary Examiner*—Angel R. Estrada
(74) *Attorney, Agent, or Firm*—Ogilvy Renault LLP

(57) ABSTRACT

A heating cable guide strip for retaining and guiding a resistance heating cable in a serpentine path on a sub-floor adapted to receive a cementitious material to form a radiant heated floor is described. The method of use is also described. The heating cable guide strip is molded of plastics material and defines an elongated flat base having a plurality of spaced-apart wire retaining guide members. The retaining guide members have at least a curved section for guiding the heating cable along a curved path about one or more of the guide members. The guide members further have a flexible cable retention flange to permit the positioning and retention of the cable captive between opposed ones of the retaining guide members. The heating cable guide strip is attached to the sub-floor by glue, nails or screws.

14 Claims, 3 Drawing Sheets

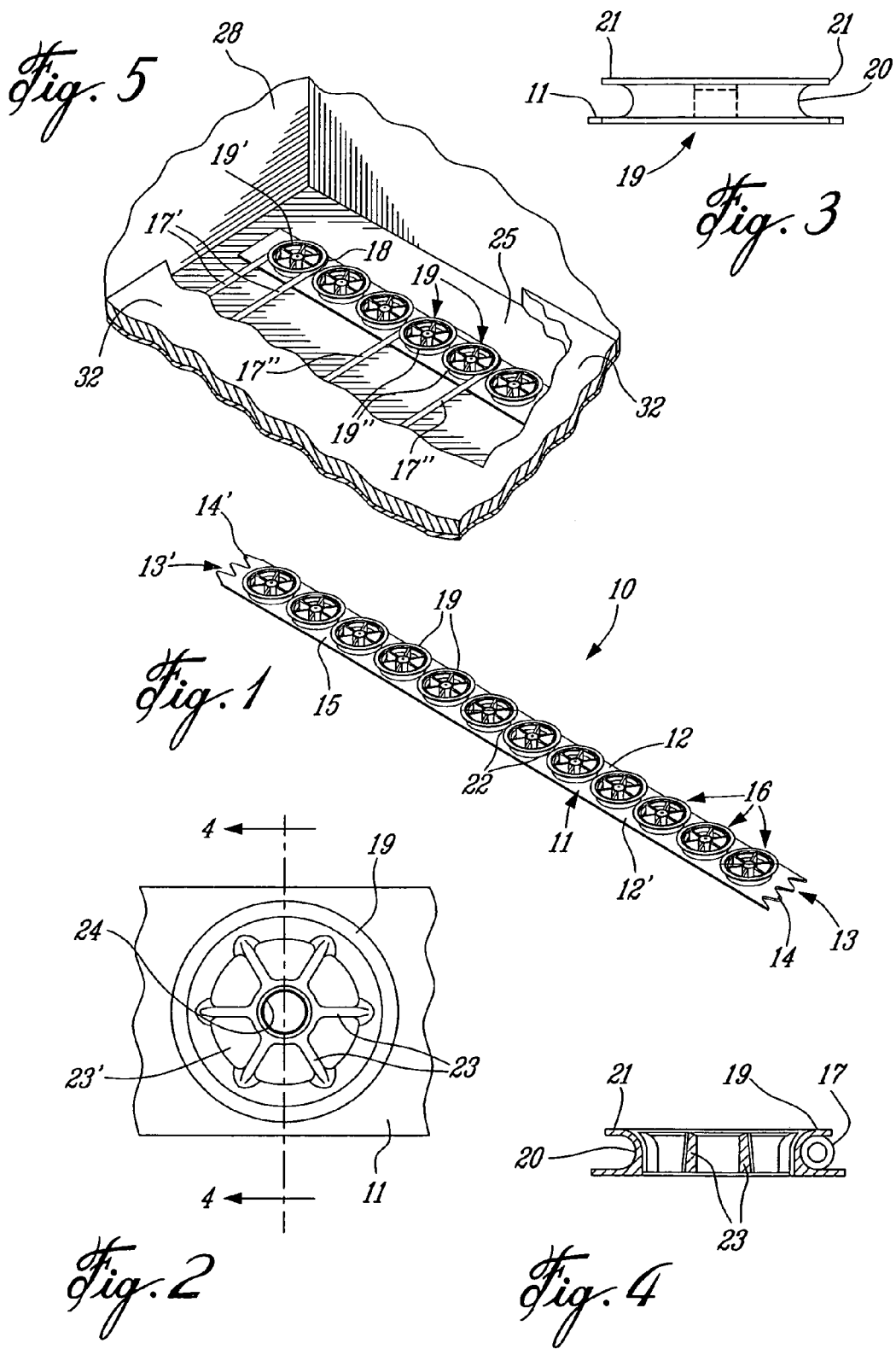

HEATING CABLE GUIDE STRIP FOR ELECTRIC RADIANT FLOOR HEATING AND METHOD OF USE

TECHNICAL FIELD

The present invention relates to a heating cable guide strip for retaining and guiding a resistance heating cable in a serpentine path over a sub-floor adapted to receive a cementitious material whereby to embed the resistance heating cable to form a radiant floor heating system.

BACKGROUND ART

Electric radiant floor heating systems are known and a typical one of these systems is described in U.S. Pat. No. 4,878,332 issued on Nov. 7, 1989 to Infloor Inc. These systems comprise a plurality of cable retaining strips which are secured to a sub-floor surface whereby to support a resistance heating cable along a serpentine path and spaced above the top surface of the sub-floor. Once the cable is installed, a cementitious slurry is then poured over the sub-floor whereby to embed the resistance heating cable into the cement layer. Resistance heating cables are today covered with a suitable insulation material whereby to protect the resistive wire and therefore the cable can lie on the top surface of the sub-floor.

There are several disadvantages with known systems and a main one is the time required to install the cable. The cable needs to be properly disposed along a predetermined serpentine arrangement over the sub-floor and properly anchored to prevent displacement and damage thereof when the cementitious product is poured thereover. The cementitious slurries may shrink and crack during its curing cycle and thus tends to disrupt the heating cable which could cause a rupture thereof rendering the system ineffective. Some known systems utilize anchoring metal strips which pinch the heating cable and any shifting of the cable during curing of the slurry can cause a cable rupture at its anchor point with the support members.

There is therefore a need to provide a system which utilizes cable guide strips for retaining and guiding the heating cable along a serpentine path and which is inexpensive, easy to install and secure the cable thereto, flexible, and reliable and which permits the installation to be effected very quickly thereby reducing the labour cost.

SUMMARY OF INVENTION

It is therefore a feature of the present invention to provide a heating cable guide strip which substantially overcomes the above-mentioned disadvantages of the prior art and which provides the above-mentioned need.

Another feature of the present invention is to provide a heating cable guide strip which permits the installation of resistance heating cables along different configurations to adapt to floor areas of varying shapes and which permits the cable to be installed in wire runs of different spacings in a quick and efficient manner.

Another feature of the present invention is to provide a method of installing a resistance heating cable in a serpentine path by the use of wire guide strips which are flexible, easy to install and which provides quick connection thereto by the resistance heating cable.

According to the above features, from a broad aspect, the present invention provides a heating cable guide strip for retaining and guiding a resistance heating cable in a serpentine path on a top surface of a sub-floor onto which is to be applied a cementitious material to embed the cable to form a radiant floor heating system. The heating cable guide strip is molded of plastics material and defines an elongated flat base having a plurality of spaced-apart wire retaining guide members disposed side-by-side aloud a straight longitudinal axis. The retaining guide members have at least a curved section for guiding the heating cable along a curved path about one or more of the guide members. The curved section merges into a top horizontal flexible flange projecting outwardly in close spaced relationship to the flange of opposed disk-shaped hubs and forming a gap to permit positioning and retention of the cable captive between opposed ones of the retaining guide members and guidance of a cable section along the at least a curved section.

According to a still further broad aspect of the present invention there is provided a method of installing a resistance heating cable in a serpentine path on a top surface of a sub-floor on which is to be poured a cementitious slurry to form a radiant floor heating system. The method comprises the steps of—providing a plurality of heating cable guide strips molded from plastic material and defining an elongated flat base having a plurality of spaced-apart wire retaining guide members disposed side-by-side along a straight longitudinal axis. The retaining guide members have at least a curved side wall section and a top horizontal flexible flange projecting outwardly of the curved side wall section. The flange of opposed guide members form a gap therebetween. The method further comprises securing the heating cable guide strips in parallel, spaced-apart, rows on the top surface of the sub-floor. The cable is disposed in a serpentine path by positioning the cable between opposed selected ones of the guide members and pushing the cable the gap against the flexible flange of opposed guide members to cause said flanges to flex to position the cable under at least a portion of the top horizontal flange thereof. The guide members of the strips are aligned with one another to form substantially parallel cable runs. The method further comprises forming curved cable ends between the parallel cable runs by bending the cable against the curved side wall section of one or more of the guide members. The one or more guide members determine the spacing between the substantially parallel cable runs. The wire guide strips are secured to the top surface of the sub-floor in aligned substantially parallel rows.

BRIEF DESCRIPTION OF DRAWINGS

A preferred embodiment of the present invention will now be described with reference to the accompanying drawings in which:

FIG. 1 is a perspective view showing the construction of a wire guide strip formed in accordance with the present invention;

FIG. 2 is a top view showing the construction of a wire retaining guide member which is constituted by a disc-shaped hub;

FIG. 3 is a side view of the disc-shaped hub of FIG. 2;

FIG. 4 is a cross-section view along cross-section lines 4-4 of FIG. 2 and showing a resistance heating cable held captive under a top horizontal circumferential flange of the disc-shaped hub and disposed on a curved portion of the hub;

FIG. 5 is a fragmented perspective view showing a section of a resistance heating cable secured about some of the disc-shaped hubs of a wire guide strip to form cable runs of different spacings;

DESCRIPTION OF PREFERRED EMBODIMENTS

Figure 6:
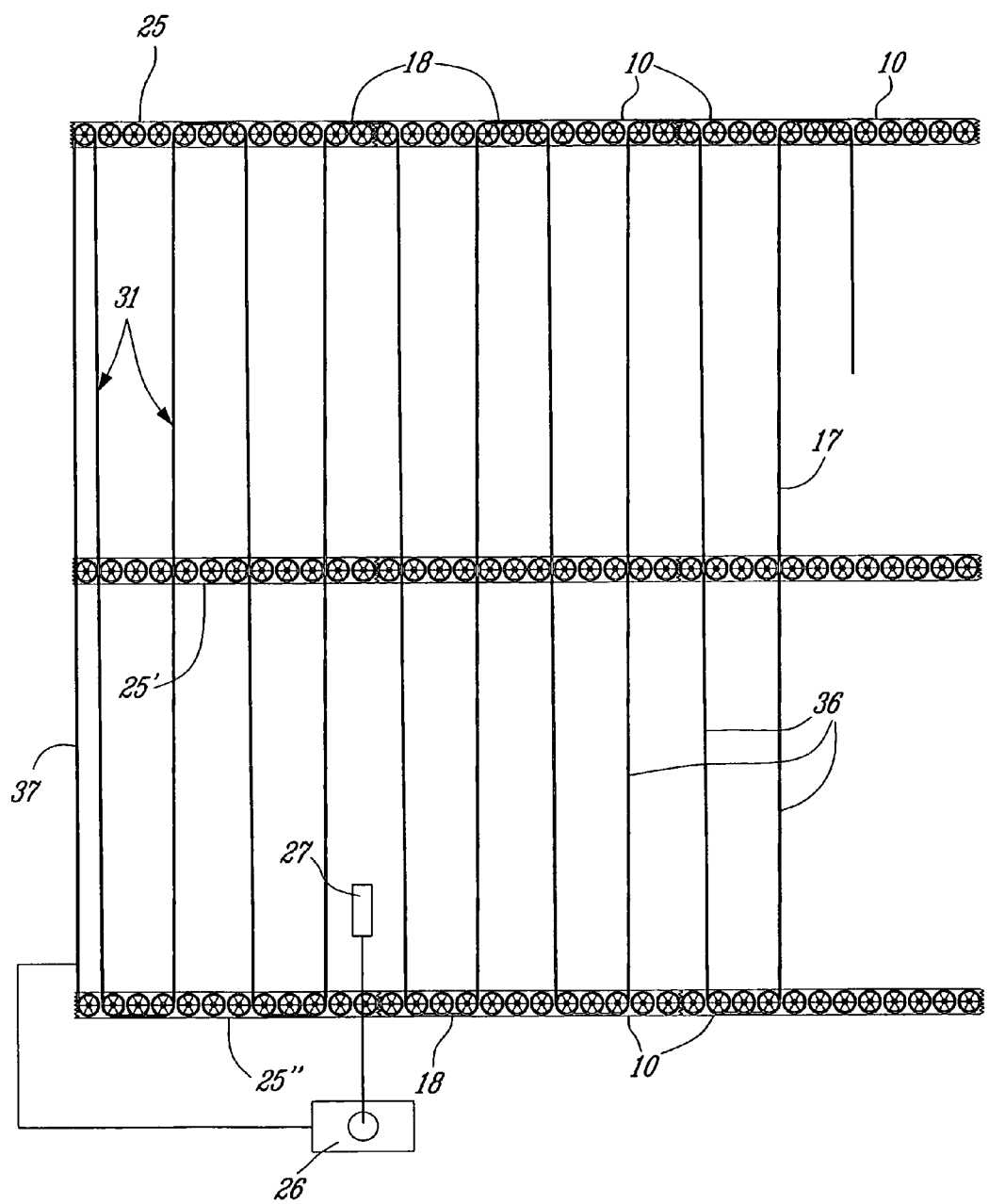
FIG. 6 is a simplified plan view showing a serpentine arrangement of a resistance heating cable secured between opposed parallel rows of wire guide strips formed in accordance with the present invention.

Referring now to the drawings and more particularly to FIGS. 1 to 4, there is shown generally at 10 the heating cable guide strip of the present invention. This guide strip is injected molded out of plastics material and is formed in lengths of approximately 12 inches although these can be shorter or longer and the length thereof is therefore not an essential feature of the present invention. As hereinshown the wire guide strip 10 defines an elongated flat base 11 of rectangular cross-section defining opposed parallel elongated edges 12 and 12' and end edges 13 and 13'. The end edges 13 and 13' are provided with inter-engaging alignment means in the form of wave-shaped formations 14 and 14' whereby two or more of these heating cable guide strips 10 can be inter-engaged in straight alignment end-to-end (see FIG. 6).

Projecting above a top surface 15 of the flat base 11 are a plurality of spaced-apart wire retaining guide members 16 for retaining and guiding a heating cable, such as the cable 17 shown in FIG. 5 along a curved path such as shown at 18. The cable 17 can be guided about one or more of the guide members 16 as shown at 17" in FIG. 5.

The wire retaining guide members 16 are each constituted by a disc-shaped hub 19 of circular outline. Each hub 19 has a concavely-shaped circumferential side wall 20 as better seen from FIGS. 3 and 4, which defines thereabout a curved wall whereby a cable, such as the cable 17, can be placed in contact with at least a curved section thereof.

Figure 7:
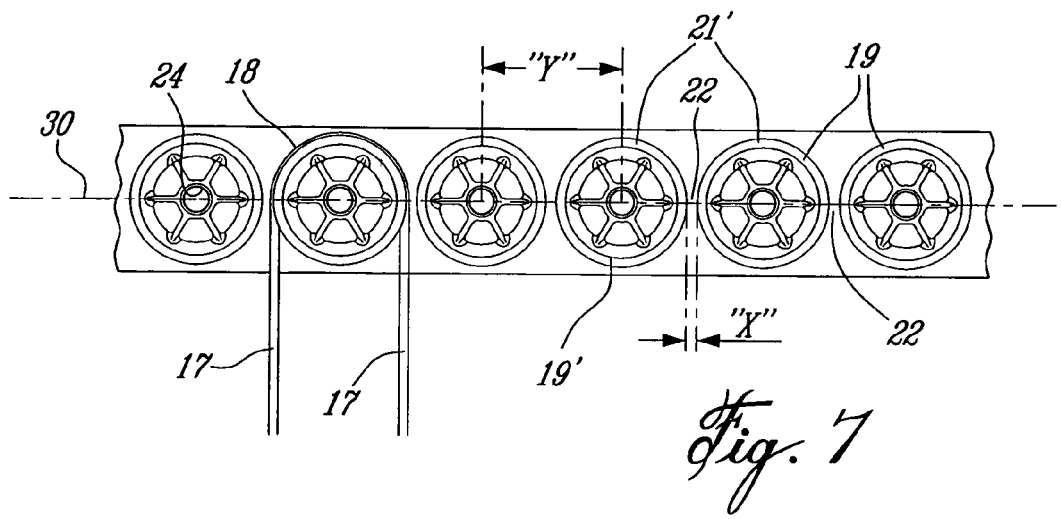
FIG. 7 is a top view of a section of a wire guide strip in enlarged view and showing a heating cable section wound over a curved portion of a disc-shaped hub.
Figure 8A:
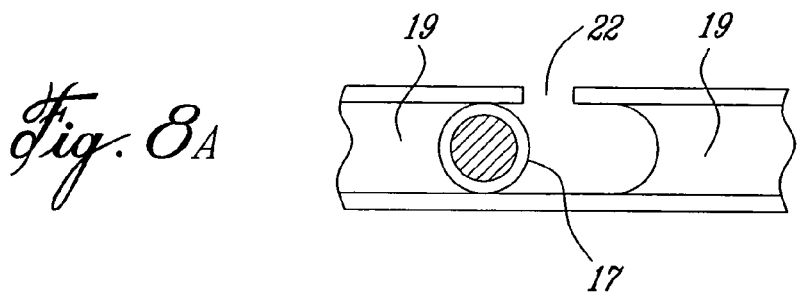
FIG. 8A is a fragmented side view showing the gap between the flexible flanges of opposed disc-shaped hubs of the strip.
Figure 8B:
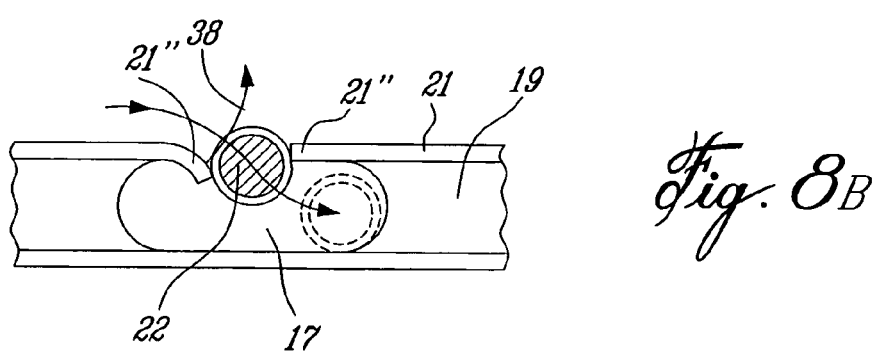
FIG. 8B is a view similar to FIG. 8A but showing a cable being positioned captive under the gap of the flexible flanges.

With further reference to FIGS. 3 and 4, it can be seen that the top end of the circumferential side wall 20 terminates into an integrally formed thin flexible circumferential flange 21 projecting outwardly of the disc-shaped hub 19. The circumferential flange 21 is dimensioned to project in close spaced relationship to the flange of an adjacent disc-shaped hub, as better illustrated in FIG. 7, wherein the circumferential flange 21 of the disc-shaped hub 19 projects in close space relationship to the circumferential flange 21' of the adjacent hub 19' in the area of the central longitudinal axis 30 of the strip. The gap 22 has a distance "x" which is smaller than the diameter of the cable 17, which is shown in FIGS. 4 and 8B and which is positioned under the circumferential flange 21, whereby a cable extending about the disc-shaped hub 19 will be held captive under the flanges 21 and/or 21" in the gap 22 by the projections of the top circumferential flanges 21 and 21'. Of course, when the cable 17 is disposed about one or more of these disc-shaped hubs 19, as shown in FIG. 5, it is guided in contact with a portion of the concave curved side wall 20 under the flange sections disposed thereover. It is also pointed out that cables of different diameters, including twisted cables, can be retained under the circumferential flange 21. Accordingly, wires of varying diameters can be used with the cable guide strip of the present invention.

As also shown more clearly in FIGS. 2 and 4, the disc-shaped hubs 19 are provided with reinforcing ribs 23 formed integral with the circumferential side wall 20 and projecting internally thereof along diametrical axes of the circular hub and merge into a central hollow ring 24. Large cavities 23' are defined between the ribs 23 to receive cement slurry therein. This hollow ring is provided to receive a nail or screw fasteners therethrough whereby to secure the strip to the top surface of a sub-floor, such as the sub-floor 25, shown in FIG. 5. Such fastener constitutes a securement means for these wire guide strips 10. The strips may also be secured by glue, not shown, but obvious to a person skilled in the art. The strip and its disc-shaped hubs 19 are designed whereby cementitious slurry will flow about all component parts and a heating wire wound thereabout to avoid air from being trapped into the slurry whereby hot spots do not develop in the cured cement about the cable embedded therein.

Figure 8C:
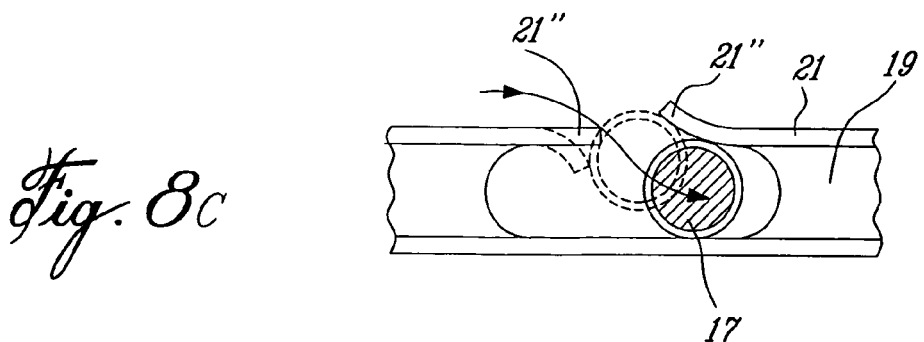
FIG. 8C is a view similar to FIG. 8A but showing a cable of larger diameter retained captive in the gap.

With reference now to FIGS. 5 and 6, there will be described a manner in which these wire guide strips are used to secure a resistance heating cable, such as the cable 17, on a sub-floor, such as the sub-floor 25. As shown in FIG. 6, these wire guide strips 10 are secured end-to-end in straight alignment relationship to form rows. As hereinshown there are three rows 25, 25' and 25" of these strips. An end of the cable 17, namely end 37, is secured to a thermostat 26 which is provided with a switch whereby to apply or remove current from the heating cable 17 as is necessary to heat the floor and a surface area above the floor, the temperature of which is sensed by the thermostat 26. A temperature sensor 27 is embedded in this slurry and provides a temperature signal to the thermostat which is used for the control, the operation of which does not form part of the present invention. The strips 10 are secured to the sub-floor and the wire is threaded in selected ones of the gaps 22 formed between adjacent ones of the disc-shaped hubs 19. To thread the cable 17 all that is necessary is to position a section of the cable over the gap 22 and apply pressure to push it through the gap. One of the flange sections 21" adjacent the gap flex inwardly, as shown in FIG. 8B, and then move upwards in the direction of arrows 38, to assume its initial shape, after the cable is pushed under the opposed flange sections 21". The cable is then captive under the gap, as shown in FIG. 8A. It is also possible that cables of slightly larger diameters, as shown in FIG. 8C, can be squeezed in the gap 22 with the flange sections 21" flexed slightly upwards to retain the cable clamped therebetween and about a section of the hub due to the flexibility of the thin flange 21.

As shown in FIG. 5, the first run of the cable 17, namely the run as identified by reference numeral 17', is threaded about a single one of the disc-shaped hubs, herein hub 19', whereby there are two cable runs 17' spaced close to one another and this could be advantageous if the side wall 28 of the room above the floor 25 is an exterior wall where more heat is required adjacent thereto. The adjacent cable run 17" could be spaced about two adjacent disc-shaped hubs, herein hubs 19" whereby the spacing between the cable 17 is further apart. Of course, if variable spacing is desired depending on heat requirements and floor dimensions, then the cable runs can be separated by larger distance by simply running the cable about three or more adjacent disc-shaped hubs. It is pointed out that in this particular embodiment the distance "y" see FIG. 7, between each hub is approximately one inch. Accordingly, the cable runs can be disposed in increments of one inch spacing from one another.

The method of using the heating cable flexible strip 10 and of installation of a resistance heating cable 17 will now be described as shown in FIGS. 5 and 6. First, a plurality of the wire guide strips 10, formed in accordance with the present invention, are secured end-to-end in rows over the sub-floor 25 by glue or fasteners. First, the outer rows 25 and 25'' are secured and the cable 17 is wound between these outer row strips. Intermediate rows 25' (only one herein shown) are thereafter installed. The intermediate rows 25' of strips are usually spaced apart about four feet from one another or any other suitable distance. The cable is disposed in the serpentine path 31 by positioning the cable between opposed selected ones of the guide members 19, as previously described, and pushing the cable in the gaps 22 and under the top horizontal circumferential flanges 21, as previously described. Cable runs 36 are thus formed with the disc-shaped hubs substantially aligned to form substantially parallel cable runs 36. The cable runs can be spaced apart equidistantly or else in a variable spacing as desired or dictated by the specification for the heated floor design. The curved cable ends or curved paths 18, as illustrated in FIG. 5, are formed by bending the cable 17 against the curved side wall section 20 of one or more of the disc-shaped hubs 19, as illustrated in FIG. 5. The curved paths eliminate sharp bends in the cable to prevent breakage.

Because the wire guide strips 10 of the present invention have a thin base wall 11, these strips can be easily cut at desired lengths whereby they can be fitted over sub-floors of different sizes and shapes so that the serpentine path can be customized for any floor size or shape. It is further pointed out that the curve shape of the wire guide member 16 facilitates tensioning the cable in a serpentine path through a plurality of these guide members by applying a slight pulling force on the cable. After the cable is completely installed, the cementitious slurry is poured over the sub-floor and left to cure.

It is within the ambit of the present invention to cover any obvious modifications of the preferred embodiment described herein, provided such modifications fall within the scope of the appended claims.

We claim:

1. A heating cable guide strip for retaining and guiding a resistance heating cable in a serpentine path on a top surface of a sub-floor onto which is to be applied a cementitious material to embed said cable to form a radiant floor heating system, said heating cable guide strip being molded of plastics material and defining an elongated flat base having a plurality of spaced-apart wire retaining guide members disposed side-by-side along a straight longitudinal axis, said retaining guide members having at least a curved section for guiding said heating cable along a curved path about one or more of said guide members, said curved section merging into a top horizontal flexible flange projecting outwardly in close spaced relationship to said top horizontal flexible flange of opposed disc-shaped hubs and forming a gap to permit positioning and retention of said cable captive between opposed ones of said retaining guide members and guidance of a cable section along said at least a curved section.

2. A wire guide strip as claimed in claim 1 wherein said wire retaining guide members are each constituted by a disc-shaped hub of circular outline projecting above a top surface of said elongated flat base.

3. A wire guide strip as claimed in claim 2 wherein said disc-shaped hub has a concavely-shaped circumferential side wall defining thereabout said at least a curved section.

4. A wire guide strip as claimed in claim 3 wherein a top end of said circumferential side wall merges into said top horizontal flexible circumferential flange; said gap being smaller than the diameter of said cable whereby to retain said cable captive under said flange in said gap.

5. A wire guide strip as claimed in claim 4 wherein there is further provided reinforcing ribs formed integral with said circumferential side wall and projecting internally of said circumferential side wall.

6. A wire guide strip as claimed in claim 5 wherein said reinforcing ribs are disposed along at least one diametrical axis of said circumferential side wall and merge into a central hollow ring.

7. A wire guide strip as claimed in claim 6 wherein said central hollow ring is adapted to receive a fastener therethrough and constitutes a securement means.

8. A wire guide strip as claimed in claim 1 wherein there is further provided securement means to attach said elongated flat base of said strip to said sub-floor by fastening means.

9. A wire guide strip as claimed in claim 8 wherein said fastening means is constituted by one of glue, nails or screw fasteners.

10. A wire guide strip as claimed in claim 1 wherein said elongated flat base is a rectangular base defining opposed end edges, said end edges being provided with inter-engaging alignment means to intermesh with an opposed end edge of a further flat base of an adjacent heating cable guide strip to maintain said strips in end-to-end aligned relationship.

11. A wire guide strip as claimed in claim 10 wherein said inter-engaging alignment means is constituted by a waved shape end edge formation.

12. A method of installing a resistance heating cable in a serpentine path on a top surface of a sub-floor on which is to be poured a cementitious slurry to form a radiant floor heating system, said method comprising the steps of:

i) providing a plurality of heating cable guide strips molded from plastic material and defining an elongated flat base having a plurality of spaced-apart wire retaining guide members disposed side-by-side along a straight longitudinal axis, said retaining guide members having at least a curved side wall section and a top horizontal flexible flange projecting outwardly of said curved side wall section, said flange of opposed guide members forming a gap therebetween, ii) securing said heating cable guide strips in parallel, spaced-apart, rows on said top surface of said sub-floor, iii) disposing said cable in said serpentine path by positioning said cable between opposed selected ones of said guide members and pushing said cable in said gap against said flexible flange of opposed guide members to cause said flanges to flex to position said cable under at least a portion of said top horizontal flange thereof, said guide members of said strip being aligned with one another to form substantially parallel cable runs, iv) forming curved cable ends between said parallel cable runs by bending said cable against said curved side wall section of one or more of said guide members, said one or more guide members determining the spacing between said substantially parallel cable runs, and v) wherein said wire guide strips are secured to said top surface of said sub-floor in aligned substantially parallel rows.

13. A method as claimed in claim 12 wherein said step (iv) comprises forming said parallel rows by intermeshing end formations of two or more of said wire guide strips and securing said strips along a straight line by fastening means.

14. A method as claimed in claim 12 wherein there is further provided the step of (vi) connecting a thermostat and associated wiring and sensor device to said heating cable, and (vii) pouring and leveling a cementitious slurry over said sub-floor and cable to embed said cable therein with said slurry flowing about and into said wire retaining guide members and cable to prevent the formation of air pockets.

* * * * *